United States Patent
Sander

(10) Patent No.: US 9,403,071 B2
(45) Date of Patent: Aug. 2, 2016

(54) POLYMERIC GOLF CLUB HEAD WITH METALLIC FACE

(71) Applicant: NIKE, Inc., Beaverton, OR (US)

(72) Inventor: Raymond J. Sander, Benbrook, TX (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 14/593,406

(22) Filed: Jan. 9, 2015

(65) Prior Publication Data

US 2015/0119165 A1 Apr. 30, 2015

Related U.S. Application Data

(63) Continuation-in-part of application No. 14/264,109, filed on Apr. 29, 2014.

(60) Provisional application No. 61/862,341, filed on Aug. 5, 2013.

(51) Int. Cl.
| | |
|---|---|
| A63B 53/04 | (2015.01) |
| B29C 45/14 | (2006.01) |
| B29L 31/52 | (2006.01) |
| B29K 101/12 | (2006.01) |
| B29K 705/00 | (2006.01) |

(52) U.S. Cl.
CPC ....... *A63B 53/0466* (2013.01); *B29C 45/14311* (2013.01); *A63B 2053/042* (2013.01); *A63B 2053/0408* (2013.01); *A63B 2053/0433* (2013.01); *A63B 2053/0491* (2013.01); *B29C 2045/14327* (2013.01); *B29K 2101/12* (2013.01); *B29K 2705/00* (2013.01); *B29L 2031/5227* (2013.01)

(58) Field of Classification Search
CPC ............. A63B 53/0466; A63B 2053/042; A63B 2053/0433; A63B 2053/0491
USPC ......... 473/324, 335, 336, 342, 344, 345, 346, 473/347, 348, 349
See application file for complete search history.

(56) References Cited

U.S. PATENT DOCUMENTS

| | | | |
|---|---|---|---|
| 4,464,324 A | 8/1984 | Hager | |
| 4,472,092 A | 9/1984 | Schmidt | |
| 4,614,627 A | 9/1986 | Curtis et al. | |
| 4,883,623 A | 11/1989 | Nagamoto et al. | |
| 5,614,143 A | 3/1997 | Hager | |
| 6,050,904 A * | 4/2000 | Kuo | 473/342 |
| 6,146,571 A * | 11/2000 | Vincent et al. | 264/221 |
| 6,162,130 A * | 12/2000 | Masumoto et al. | 473/324 |
| 6,508,978 B1 | 1/2003 | Deshmukh | |
| 6,623,378 B2 | 9/2003 | Beach et al. | |
| 6,648,774 B1 * | 11/2003 | Lee | 473/342 |
| 6,824,636 B2 | 11/2004 | Nelson et al. | |
| 2005/0026723 A1 | 2/2005 | Kumamoto | |
| 2005/0266933 A1* | 12/2005 | Galloway | 473/342 |
| 2006/0240908 A1 | 10/2006 | Adams et al. | |
| 2008/0194355 A1 | 8/2008 | Liu | |
| 2011/0236699 A1 | 9/2011 | Heikkila | |
| 2013/0178305 A1 | 7/2013 | Beno et al. | |

* cited by examiner

*Primary Examiner* — Benjamin Layno
(74) *Attorney, Agent, or Firm* — Quinn Law Group, PLLC

(57) ABSTRACT

A golf club head includes a club face and a body. The club face is formed from a metallic material and includes a first, hitting surface, a second, rear surface that is opposite the first surface, and a flange that is separated from the second surface by a transverse distance. The body is formed from a polymeric material and includes a crown, a sole, a hosel, and a face support. The club face and the body cooperate to define a closed volume, and the face support extends to opposing sides of the flange and is operative to couple the club face to the body.

19 Claims, 4 Drawing Sheets

POLYMERIC GOLF CLUB HEAD WITH METALLIC FACE

CROSS REFERENCE TO RELATED APPLICATIONS

This application is a continuation-in-part of U.S. patent application Ser. No. 14/264,109, filed on Apr. 29, 2014, which claims the benefit of priority from U.S. Provisional Application No. 61/862,341, filed Aug. 5, 2013, both applications are hereby incorporated by reference in their entirety.

TECHNICAL FIELD

The present disclosure relates generally to a golf club having a metallic face and a polymeric body.

BACKGROUND

A golf club may generally include a club head disposed on the end of an elongate shaft. During play, the club head may be swung into contact with a stationary ball located on the ground in an effort to project the ball in an intended direction and with a desired vertical trajectory.

Many design parameters must be considered when forming a golf club head. For example, the design must provide enough structural resilience to withstand repeated impact forces between the club and the ball, as well as between the club and the ground. The club head must conform to maximum size requirements set by different rule setting associations, and the face of the club must not have a coefficient of restitution above a predefined maximum (measured according to applicable standards). Assuming that certain predefined design constraints are satisfied, a club head design is typically quantified by the magnitude and location of the center of gravity, as well as the head's moment of inertia about the center of gravity and/or the shaft.

The club's moment of inertia relates to the club's resistance to rotation (particularly during an off-center hit), and is often perceived as the club's measure of "forgiveness." In typical driver designs, high moments of inertia are desired to reduce the club's tendency to push or fade a ball. Achieving a high moment of inertia generally involves placing mass as close to the perimeter of the club as possible (to maximize the moment of inertia about the center of gravity), and as close to the toe as possible (to maximize the moment of inertia about the shaft).

While the moment of inertia affects the forgiveness of a club head, the location of the center of gravity behind the club face (and above the sole) generally affects the trajectory of a shot for a given face loft angle. A center of gravity that is positioned as far rearward (away from the face) and as low (close to the sole) as possible typically results in a ball flight that has a higher trajectory than a club head with a center of gravity placed more forward and/or higher.

While a high moment of inertia is obtained by increasing the perimeter weighting of the club head, an increase in the total mass/swing weight of the club head (i.e., the magnitude of the center of gravity) has a strong, negative effect on club head speed and hitting distance. Said another way, to maximize club head speed (and hitting distance), a lower total mass is desired; however a lower total mass generally reduces the club head's moment of inertia (and forgiveness).

In the tension between swing speed (mass) and forgiveness (moment of inertia), it may be desirable to place varying amounts of mass in specific locations throughout the club head to tailor a club's performance to a particular golfer or ability level. In this manner, the total club head mass may generally be categorized into two categories: structural mass and discretionary mass.

Structural mass generally refers to the mass of the materials that are required to provide the club head with the structural resilience needed to withstand repeated impacts. Structural mass is highly design-dependant, and provides a designer with a relatively low amount of control over specific mass distribution. On the other hand, discretionary mass is any additional mass that may be added to the club head design for the sole purpose of customizing the performance and/or forgiveness of the club. In an ideal club design, the amount of structural mass would be minimized (without sacrificing resiliency) to provide a designer with a greater ability to customize club performance, while maintaining a swing weight that is expected by the consumer.

In the interest of minimizing the total structural mass, most metal woods, for example, generally employ a thin metal face and hollow structural shell formed from a high strength, lightweight metal alloy. Such a design, while effective in reducing structural mass, may involve complex, multi-stage manufacturing processes, and may be limited in further advancements due to the cost prohibitive nature of more advanced alloys.

Another design factor involves the type of face style that is chosen for the club. In metal woods, the majority of designs can be categorized as either having a cup-face, or an edge-welded face plate. The face plate design typically involves a substantially planar (or slightly curved) metallic plate that is fused to the body at or near the forward, face portion of the club to form the hitting surface. This plate is typically inlaid into a slight recess, and welded or fused to the body at, or proximate to the edge of the plate.

A cup-faced design includes a similar metallic plate/hitting surface, however, the plate extends beyond just the forward, face portion and onto the sole/crown of the body. Such a design extends the weld-line rearward, behind the hitting surface. In this manner, the cup-face design can provide a slightly larger possible hitting surface, and reduces the possibility for a welded edge to affect the impact characteristics of the club head.

SUMMARY

A golf club head includes a club face and a body. The club face is formed from a metallic material and includes a first, hitting surface, a second, rear surface that is opposite the first surface, and a flange that is separated from the second surface by a transverse distance. The body is formed from a polymeric material and includes a crown, a sole, a hosel, and a face support. The club face and the body cooperate to define a closed volume, and the face support extends to opposing sides of the flange and is operative to couple the club face to the body. In one configuration, a portion of the flange extends along a direction that is within about 30 degrees of parallel to a portion of the first surface.

In one embodiment, the club face is a cup-face style design. In this configuration, the hitting surface of the club face is coupled with the flange through a side-wall portion, and the side-wall portion forms an outer surface of the golf club head.

In one configuration, the flange defines a plurality of holes extending between the opposing sides. As such, a portion of the face support is disposed within each of the plurality of holes. This portion may be formed into the plurality of holes during a molding process such as injection molding or compression molding.

In one configuration the body includes a metallic weight captured within the polymeric material. The metallic weight may be disposed within a band of material between the crown and the sole and adjacent a perimeter of the golf club head.

In one configuration, the hosel is integrally formed with the face support. The body may, for example be formed from three distinct pieces that are fused or adhered together. As such, in one configuration, there may be a seam disposed between the crown and the sole, between the crown and the forward portion, and between the sole and the forward portion. The seam may include at least two layers of the polymeric material that are coupled through at least one of an adhesive or a joining process such as ultrasonic or laser welding.

DETAILED DESCRIPTION

Figure 1:
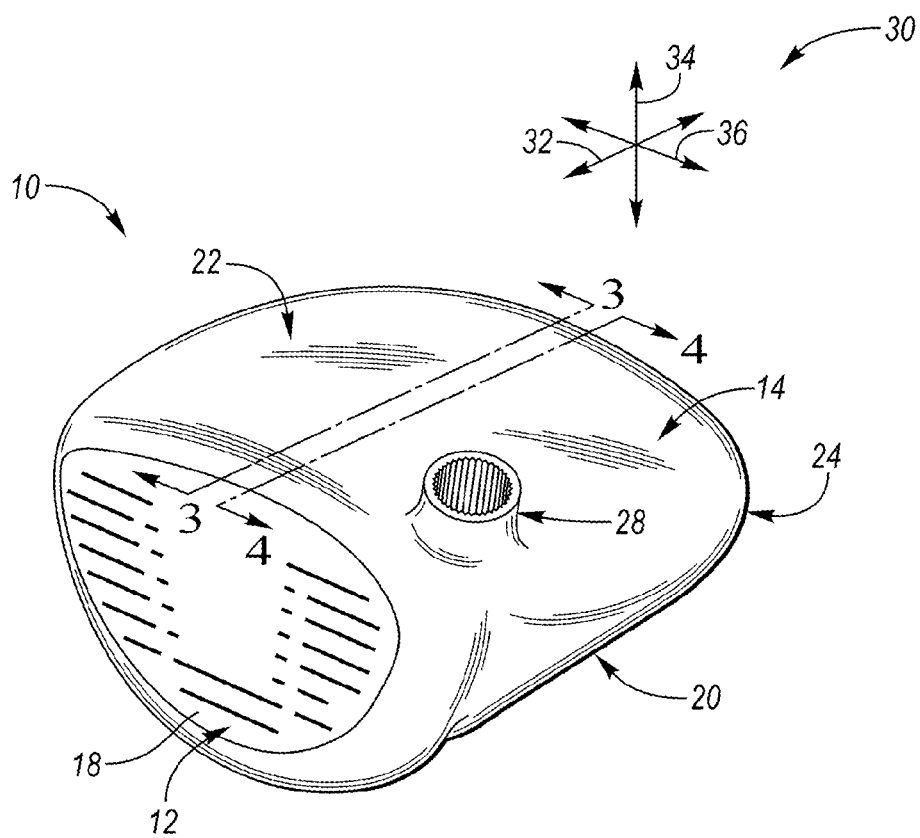
FIG. 1 is a schematic perspective view of a golf club head.
Figure 2:
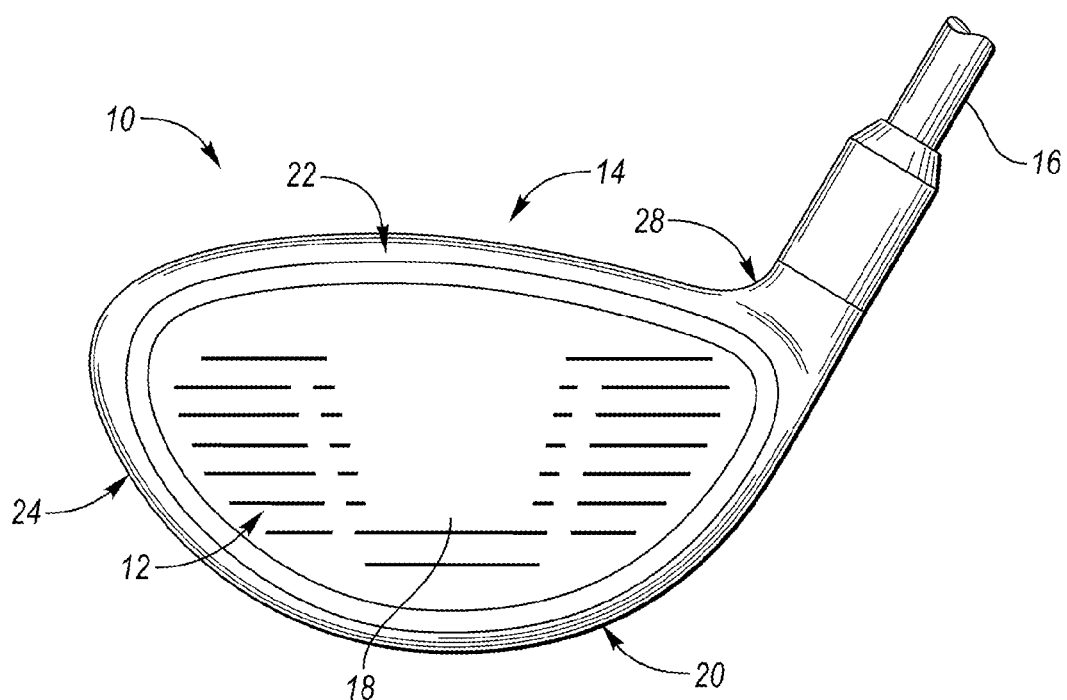
FIG. 2 is a schematic front view of a golf club head.

Referring to the drawings, wherein like reference numerals are used to identify like or identical components in the various views, FIG. 1 schematically illustrates a schematic perspective view of a wood-type golf club head 10 (i.e., "club head 10") that generally includes a face portion 12 (i.e., the "face 12") and a body portion 14 (i.e., the "body 14"). As generally illustrated in FIG. 2, the club head 10 may be mounted on the end of an elongate shaft 16, which may, in turn, be gripped and swung by a user to impart a generally arcuate motion to the club head 10.

The face 12 of the club head 10 may generally define a hitting surface 18 that is intended to contact a golf ball during a typical swing. The hitting surface 18 may be a planar surface, or may have a slight convex/arcuate curvature that extends out from the club head 10 (i.e., a bulge or roll curvature). Additionally, as is commonly understood, the hitting surface 18 may be disposed at an angle to a vertical plane when the club is held in a neutral hitting position. This angle may be generally referred to as the loft angle or slope of the club. Wood-type club heads (including hybrid woods) may most commonly have a loft angle of from about 8.5 degrees to about 24 degrees, though other loft angles are possible and have been commercially sold.

The body 14 of the club head 10 is configured to support the face 12 and to provide a connection means between the face 12 and the elongate shaft 16. Referring again to FIG. 1, the body 14 may generally include a lower portion 20 (i.e., a "sole 20") and an upper portion 22 (i.e., a "crown 22"). For the purpose of this description, the crown 22 may meet the sole 20 where the surface has a vertical tangent when the club head is held in a neutral hitting position. In practice, a portion of the sole 20 near this transition point may also be referred to as the skirt 24. Finally, the club head 10 includes a hosel 28 that is configured to receive and/or otherwise couple with the elongate shaft 16 or shaft adapter. With a face-plate design, the body 14 may further include a forward-facing wall 26 that at least partially abuts the face 12. Axes 30 further define directionally-related portions of the club head 10, including a fore-aft axis 32 extending through the face 12 (generally indicating front and rear portions/directions of the club head 10), a vertical axis 34 extending perpendicular to the fore-aft axis 32 and between the sole 20 and crown 22, and a toe-heel axis 36 extending perpendicular to both the fore-aft axis 32 and the vertical axis 34.

Figure 3:
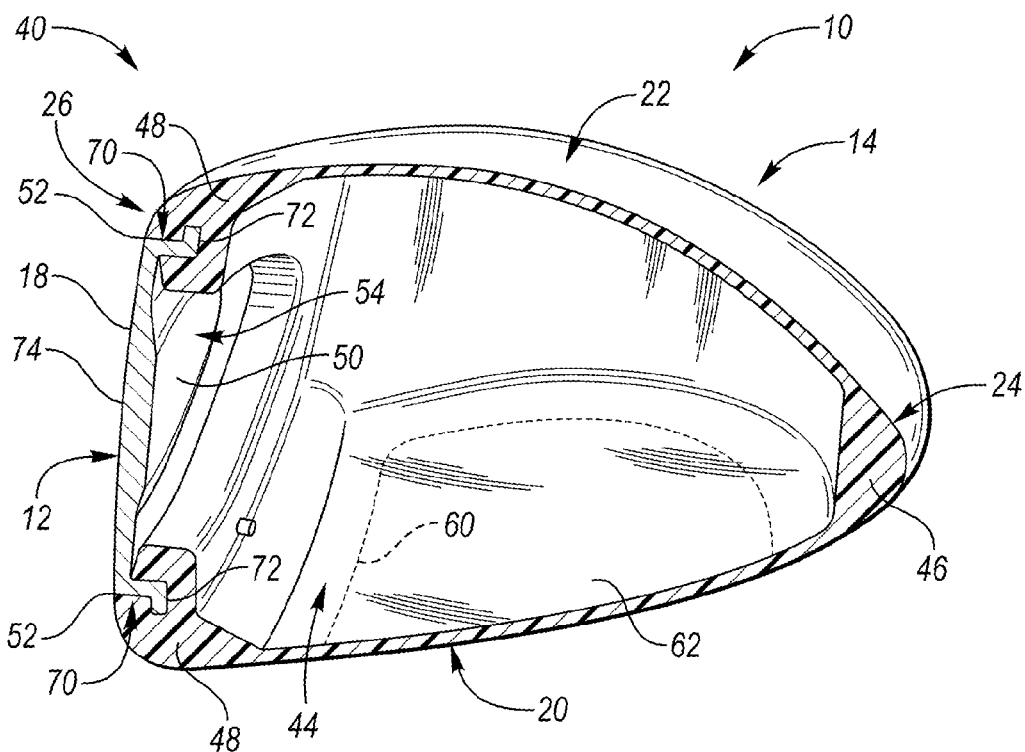
FIG. 3 is a schematic cross-sectional view of the golf club head provided in FIG. 1, taken along line 3-3.
Figure 4:
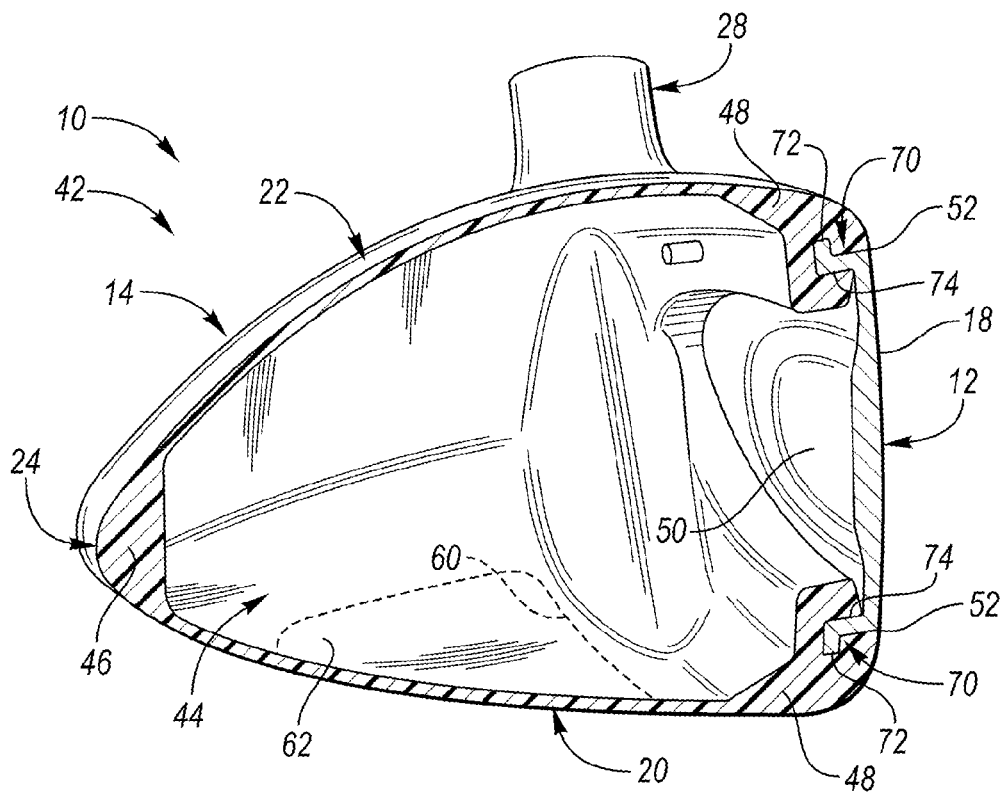
FIG. 4 is a schematic cross-sectional view of the golf club head provided in FIG. 1, taken along line 4-4.

FIGS. 3 and 4 generally illustrate schematic cross-sectional views 40, 42 of one embodiment of the club head 10, taken along a vertical, fore-aft plane and respectively facing in opposite directions (i.e., FIG. 3 is generally toe-facing, and FIG. 4 is generally heel-facing). As shown, the body 14 may at least partially surround and/or define an internal volume/cavity 44 that may be filled with air. While FIGS. 3 and 4 illustrate the cavity 44 as being a closed cavity (i.e., isolated from the external environment), in other embodiments the cavity 44 may be partially open, such as by removing a portion of one or both of the crown 22 and sole 20.

The views 40, 42 provided in FIGS. 3 and 4 further illustrate the thin-walled nature of the crown 22 and sole 20. In one configuration, the club head may include a band of thicker material 46 disposed about the perimeter of the body 14 (i.e., perimeter when viewed from the top/above the crown 22 along the vertical axis 34) and between the crown 22 and the sole 20. This band of material 46 may serve a structural function by reinforcing the outward edge of the body 14 against impacts, though may also be varied throughout the club head 10 to increase the moments of inertia and/or alter the center of gravity.

The face 12 may generally be formed from a metal or metal alloy, and may be structurally supported on the body 14 by a face support 48. The face support 48 may be a thicker portion of the body 14 that may support the face 12 and transfer any impact forces from the face to the remainder of the body 14. In one configuration, the face support 48 may be disposed only near the perimeter 52 of the face 12, thus leaving a portion 54 of the rear surface 50 of the face 12 exposed to the cavity 44.

To reduce structural mass beyond what is economically viable with metal alloys, the body 14 of the club head 10 may be formed from a polymeric material having a yield strength that is great enough to withstand the repeated stress imparted by the ball impact. Examples of such materials may include certain polyamides, polyimides, polyamide-imides, polyetheretherketones (PEEK), polycarbonates, engineering polyurethanes, and/or other similar materials. In general, the polymeric material may be either thermoplastic or thermoset, and may be unfilled, glass fiber filled, carbon fiber filled, or may have other suitable fillers and/or additives to promote increased strength. In one configuration, a suitable material may have a tensile strength of at least about 180 MPa, while in other configurations it may have a tensile strength of at least about 220 MPa.

Figure 7:
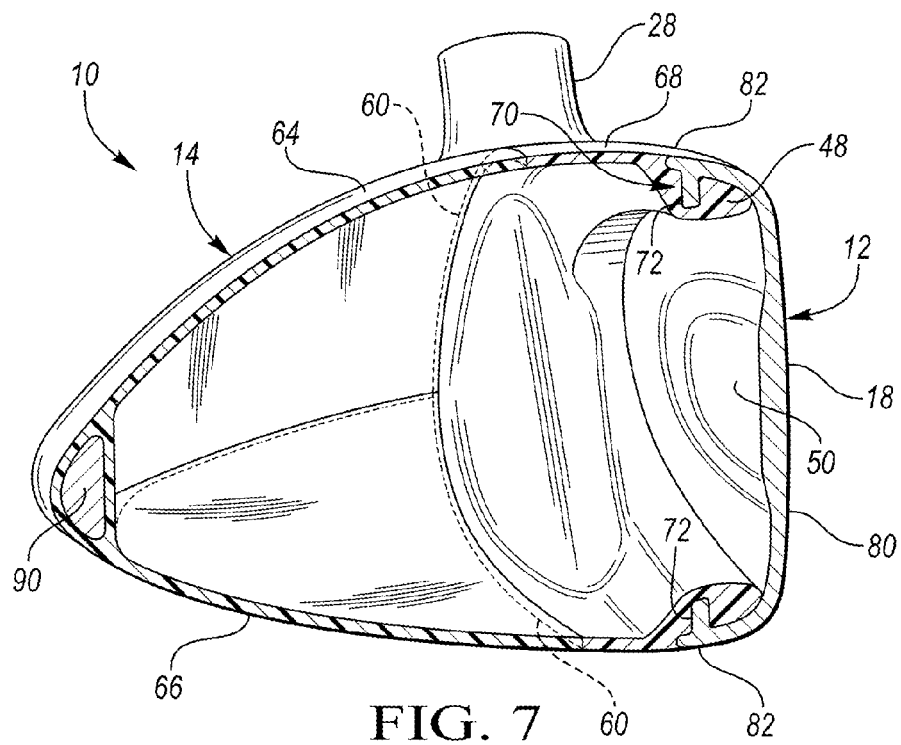
FIG. 7 is a schematic cross-sectional view of an embodiment of a golf club head.

In one configuration, the entire polymeric body 14 may be formed as a single, continuous piece. Such a design may have strength benefits by reducing seams, weld lines, or other parting lines that may act as stress concentration points. In another configuration, the design of the body 14 may include a single seam 60 located within the sole 20, where a sole plate 62 may be subsequently bonded/fused to the body 14 to form a closed cavity 44 (if desired). In still other designs, such as schematically shown in FIG. 7, the body 14 may be formed from three or more polymeric components, including, for example, a crown portion 64 ("crown"), a sole portion 66 ("sole"), and a forward portion 68, all of which may be fused together using an adhesive or other joining process such as ultrasonic welding, laser welding, or the like. As shown, the forward portion 68 may include both the hosel 28 and the face support 48 integrally formed from the polymeric material. In such an embodiment, a seam 60 may be disposed between the crown 64 and the sole 66, between the crown 64 and the forward portion 68, and between the sole 66 and the forward portion 68. The seam 60 may, for example, include a fused or adhered lap joint that includes at least two layers of the polymeric material.

To provide a rigid connection between the face 12 and the body 14, the face 12 may include one or more mechanical locking features 70 disposed about its perimeter 52. The locking features 70 are configured to mechanically interlock with a portion of the body 14 to hold the face in position. In one configuration, the locking feature may include a flange 72 that is positioned apart from the rear-facing surface 50 of the face 12 and that may be embedded within the face support 48 during the fabrication of the body 14. For example, the polymer used to form the body 14 may be over-molded around the flange 72, such that the polymer contacts and surrounds the flange 72 up to, for example, the rear-facing surface 50 of the face 12. In this manner, the polymer may extend on opposing sides of the flange 72. Once the polymer has solidified, it may firmly secure the flange within the face support 48, and interfere with the flange's ability to withdraw from the support 48. In one configuration, the flange 72 is connected to the remainder of the face 12 through an extension member 74 that extends from the rear surface 50 of the face 12 in a direction away from the hitting surface 18. In the face-plate designs, such as shown in FIGS. 3-6, this extension member 74 may be entirely surrounded by polymer.

In addition to providing a rigid coupling means, the over-molded flange 72 may also aid in transferring impact forces from the face 12 to the body 14 by increasing the contact area between the face 12 and the body 14 (i.e., thus lowering contact pressures and/or stress concentration points). The over-molding process may also ensure that uniform contact is achieved between the flange 72 and the face support 48 across the entire surface area of the flange 72. In this manner, over-molding may promote a more uniform force transfer than a club head with an affixed face inlay, which may only make firm contact at a plurality of discrete points.

Figure 5:
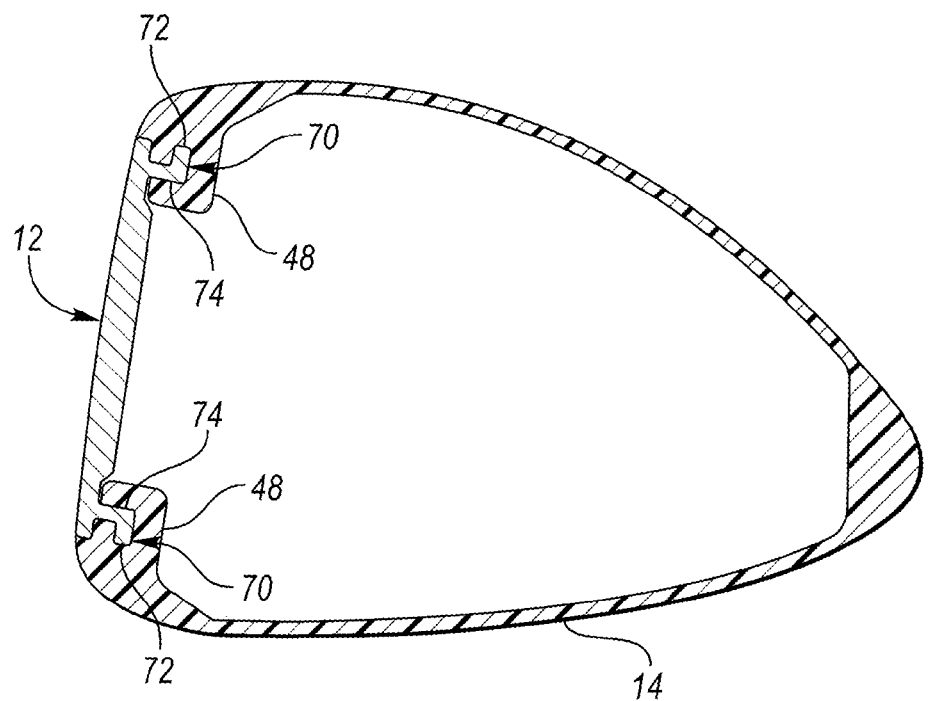
FIG. 5 is a schematic cross-sectional view of an embodiment of a golf club head.
Figure 6:
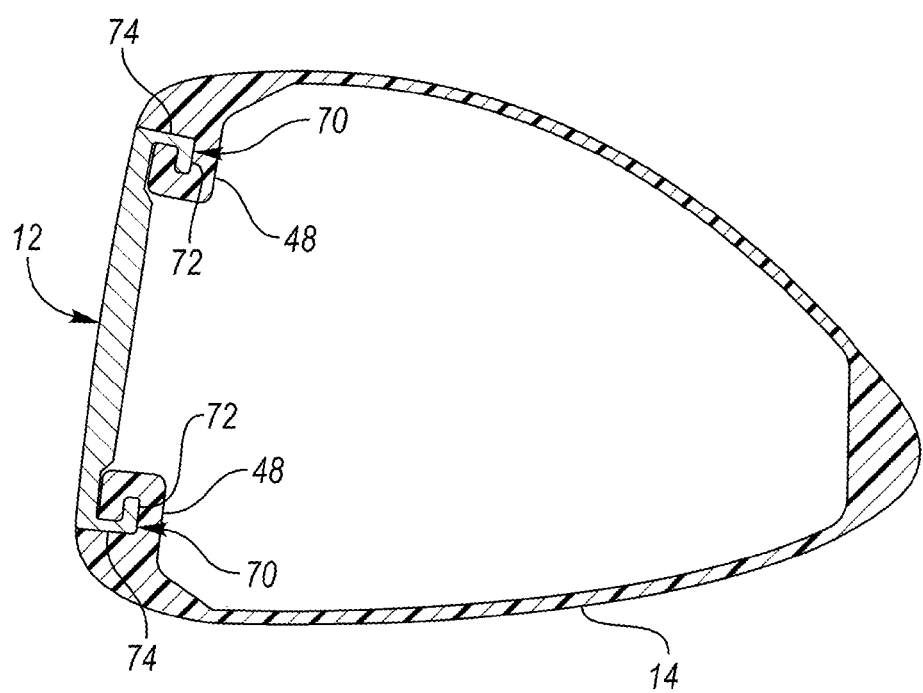
FIG. 6 is a schematic cross-sectional view of an embodiment of a golf club head.

While suitable locking features 70 may include a variety of shapes and sizes, the example illustrated in FIGS. 3 and 4 is generally an "L"-shaped locking feature 70 (including the extension member 74 and flange 72) that extends from the rear surface 50 of a face-plate style face. FIGS. 5-6 generally illustrate other locking feature designs that may be used to mechanically retain the face 12 within the club body 14. These examples include a dual-flange design (FIG. 5) and a radially inward facing "L" flange design (FIG. 6). Still other configurations may include hooks, tabs, angled posts, or other such protrusions that may likewise mechanically interlock with the body 14.

Figure 8:
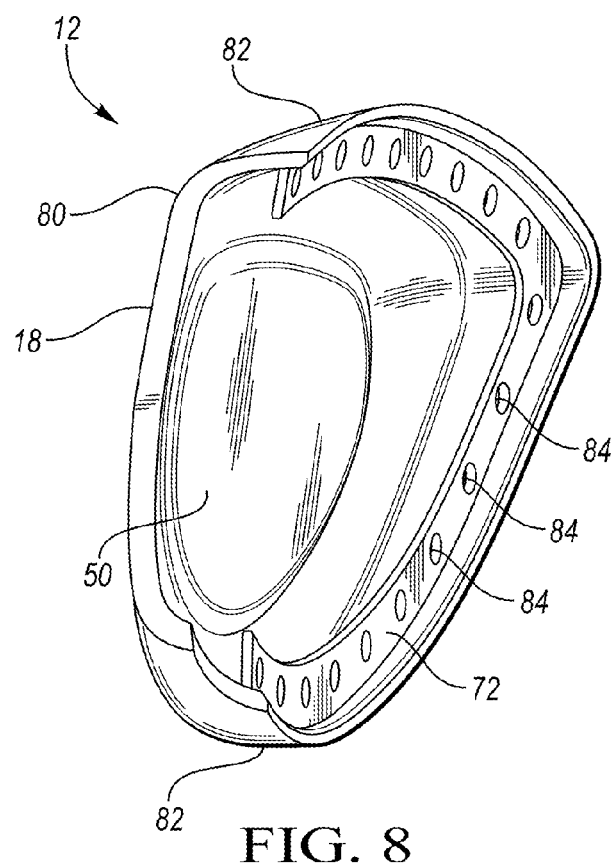
FIG. 8 is a schematic perspective view of the rear portion of a cup-face style face of a golf club head.

FIG. 7 provides a schematic cross-sectional view of a club head with a cup-face design. As shown, the cup-face 80 includes a side-wall portion 82 that extends from the perimeter of the hitting surface 18 toward the rear of the club head 10. A flange 72 extends radially inward from the sidewall portion 82 of the face 12, and is mechanically secured to the body 14 via the face support 48. In addition to serving as an exterior surface of the clubhead 10, the sidewall 82 may also serve a similar purpose as the extension member 74. FIG. 8 illustrates a rear view of the cup-face 80, apart from the body 14. As shown, in one configuration, the flange 72 includes a plurality of holes 84. These holes 84 may be useful during the molding process to allow molten polymer to more easily extend to both sides of the flange 72. As such, once solidified, a portion of the face support 48 may be disposed within each of the plurality of holes 84. In one embodiment, there may be from about 5 to about 50 holes, or from about 10 to about 40 holes, or even from about 15 to about 30 holes. Additionally, each hole may have a diameter of from about 2 mm to about 8 mm, or from about 2 mm to about 5 mm, which may be sufficient to allow molten polymer to flow to both sides of the flange 72.

Common to all of the above-described locking feature designs is a flange 72 extending in a direction that is generally parallel to the face 12 and/or may meet the sidewall 82 at about a 90 degree angle. The flange 72 is separated from the rear surface 50 by a distance that is sufficient to permit the polymer of the body 14 to flow between the flange 72 and the rear-facing surface 50 of the face 12 such that it can mechanically secure the face 12 and prevent the face 12 from freely withdrawing from the body 14. In one configuration, the separation distance may be from about 5.0 mm to about 30.0 mm. Additionally, because the face 12 may have a slight bulge/roll curvature, the term "generally parallel," it is intended to indicate that the flange 72 is parallel to a portion of the hitting surface 18 to within about +/−30 degrees. Regardless of the design, the hitting surface 18, extension member 74 (or sidewall 82), and flange 72 may all be formed from one or more metallic materials.

As discussed above, the present club head 10 may be fabricated by molding a high tensile strength polymer material into the shape of the club body 14, while ensuring that the polymer material also over-molds certain locking features of the metallic face 12.

In general, any traditional molding technique may be used to form the body 14, however, injection molding may be the most straightforward process. During the injection molding process, one or more molding dies may define a molding cavity, with the flange 72 of the face 12 being disposed within the molding cavity. A suitable molten polymer may then be injected into the mold cavity such that the polymer extends to opposing sides of the flange 72. Once the polymer solidifies and/or cures, the flange 72 is then firmly held in place within the polymer. For single-piece body constructions, a molding technique, such as lost-core molding may be used to form the body. In multi-piece body designs, molding techniques such as injection molding or compression molding may similarly be used.

Referring again to FIG. 7, in one configuration, the body 14 may include one or more weights 90, such as captured metallic inserts, that may be used to alter the magnitude and/or position of the club head center of mass and/or one or more moments of inertia of the club head 10. In one configuration, the one or more weights 90 may be formed into the club head 10, for example, by overmolding the weights 90 during the molding of one of the crown 22 or sole 20. The weights 90 may, for example, be integrally molded into the band of material 46 disposed around the perimeter of the club head 10. In another configuration, the one or more weights 90 may be separately adhered into a recess that is created during the molding process.

The one or more weights 90 may include, for example, one or more metallic objects, such as metallic discs or metallic bands. Such a weight may increase the moment of inertia about a vertical axis, and may move the center of mass rearward of the face. In an embodiment using a metallic band, the band may have a varying cross-sectional thickness to enable more precise control over the location of the center of mass and the various moments of inertia.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description, for convenience, "polymer" and "resin" are intended to be synonymous and to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. In other words, "or" means "and/or." When the terms first, second, third, etc. are used to differentiate various items from each other, these designations are merely for convenience and do not limit the items.

The invention claimed is:

1. A golf club head comprising:
   a club face formed from a metallic material and including a first, hitting surface, a second, rear surface that is opposite the first surface, an extension member and a flange; wherein the flange is separated from the second surface via the extension member, and wherein the flange is disposed within about 30 degrees of parallel to a portion of the first surface;
   a body formed from a filled or unfilled polymeric material and including a crown, a sole, a hosel, and a face support;
   wherein the club face and the body cooperate to define a closed volume;
   wherein the flange is embedded within the face support such that the face support contacts and surrounds the flange to couple the club face to the body.

2. The golf club head of claim 1, wherein the extension member forms an outer surface of the golf club head.

3. The golf club head of claim 1, wherein the flange defines a plurality of holes extending between the opposing sides; and
   wherein a portion of the face support is disposed within each of the plurality of holes.

4. The golf club head of claim 1, wherein the face support contacts the second surface of the club face.

5. The golf club head of claim 1, wherein the body includes a metallic weight captured within the polymeric material.

6. The golf club head of claim 5, wherein the metallic weight is disposed between the crown and the sole and adjacent a perimeter of the golf club head.

7. The golf club head of claim 1, wherein the hosel is integrally formed with the face support.

8. The golf club head of claim 7, wherein the hosel and face support are integrally formed as a forward portion of the body; and
   further comprising a seam disposed between the crown and the sole, between the crown and the forward portion, and between the sole and the forward portion.

9. The golf club head of claim 8, wherein the seam includes at least two layers of the polymeric material that are coupled through at least one of an adhesive or a joining process.

10. The golf club head of claim 1, wherein the body has a varying wall thickness between the face support and both of the crown and the sole.

11. A method of manufacturing a golf club head comprising:
    providing a club face formed from a metallic material and including a first, hitting surface, a second, rear surface that is opposite the first surface, and a flange that is separated from the second surface via an extension member and is disposed within about 30 degrees of parallel to a portion of the first surface;
    molding a body from a filled or unfilled polymeric material, wherein the body includes a crown, a sole, a hosel, and a face support, and wherein the molding includes embedding the flange within the face support by flowing molten polymer into a contacting and surrounding arrangement about the flange; and
    wherein the club face and the body cooperate to define a closed volume.

12. The method of claim 11, wherein the extension member forms an outer surface of the golf club head.

13. The method of claim 11, wherein the flange defines a plurality of holes extending between the opposing sides; and
    wherein molding the body includes forming a portion of the face support within each of the plurality of holes.

14. The method of claim 11, wherein molding the body includes capturing a metallic weight within the polymeric material.

15. The method of claim 11, wherein molding the body includes integrally molding the hosel with the face support.

16. A golf club head comprising:
    a club face formed from a metallic material and including a first, hitting surface, a second, rear surface that is opposite the first surface, and a flange that is separated from the second surface;
    a body formed from a filled or unfilled polymeric material and including a crown, a sole, a hosel, and a face support;
    wherein the face support is molded such that it extends to opposing sides of the flange and is operative to couple the club face to the body;
    wherein the hitting surface of the club face is coupled with the flange through a side-wall portion; and
    wherein the side-wall portion forms an outer surface of the golf club head.

17. The golf club head of claim 16, wherein the flange defines a plurality of holes extending between the opposing sides; and
    wherein a portion of the face support is disposed within each of the plurality of holes.

18. The golf club head of claim 16, wherein the body includes a metallic weight captured within the polymeric material.

19. The golf club head of claim 18, wherein the metallic weight is disposed between the crown and the sole and adjacent a perimeter of the golf club head.

* * * * *